United States Patent [19]
Jonner et al.

[11] Patent Number: 5,826,950
[45] Date of Patent: Oct. 27, 1998

[54] METHOD AND APPARATUS FOR CONTROLLING THE BRAKE SYSTEM OF A VEHICLE

[75] Inventors: Wolf-Dieter Jonner, Schmidhausen; Helmut Pueschel, Marbach; Guenther Schmidt, Tauberbischofsheim, all of Germany

[73] Assignee: Robert Bosch GmbH, Stuttgart, Germany

[21] Appl. No.: 712,204

[22] Filed: Sep. 11, 1996

[30] Foreign Application Priority Data

Oct. 7, 1995 [DE] Germany .................. 195 37 439.8

[51] Int. Cl.$^6$ ........................................... B06T 8/34
[52] U.S. Cl. ................................. 303/113.2; 303/39
[58] Field of Search ........................ 303/139, 113.2, 303/140, 148, 125; 701/82, 83

[56] References Cited

U.S. PATENT DOCUMENTS

| | | | |
|---|---|---|---|
| 5,188,437 | 2/1993 | Willmann | 303/113.2 |
| 5,205,623 | 4/1993 | Holzmann et al. | 303/113.2 |
| 5,322,356 | 6/1994 | Kolbe et al. | 303/113.5 X |
| 5,368,374 | 11/1994 | Fujimoto et al. | 303/139 X |
| 5,407,257 | 4/1995 | Iwata | 303/139 X |
| 5,511,865 | 4/1996 | Howell | 303/177 X |
| 5,688,029 | 11/1997 | Bach et al. | 303/148 X |

FOREIGN PATENT DOCUMENTS 4107978 9/1992 Germany.

*Primary Examiner*—Lee W. Young
*Attorney, Agent, or Firm*—Fulbright & Jaworski

[57] ABSTRACT

During ASR control of spinning drive wheels, the pressure level in the wheel brake with the highest pressure level is modulated by driving a switching valve USV which affects the pressure in all the wheel brakes of the brake circuit, whereas the pressure level in the other wheel brake or brakes is controlled by way of wheel-specific inlet and outlet valves. The intake control valve ASV is kept open through the entire ASR control period. As a result, the electrically actuated ASV can be replaced by a hydraulically actuated ASV.

15 Claims, 4 Drawing Sheets

METHOD AND APPARATUS FOR CONTROLLING THE BRAKE SYSTEM OF A VEHICLE

BACKGROUND OF THE INVENTION

The invention pertains to a method and to an apparatus for controlling the brake system of a vehicle.

A method and an apparatus of this type are known from, for example, DE 41 07 978 A1. When at least one of the drive wheels is experiencing an increased level of drive slip, an electronic control unit closes a control valve (switching valve) installed in the brake line leading to the drive wheel or wheels. This control unit also activates a pressure-generating means (return pump) to build up the pressure in the brake line or lines and opens another control valve (intake valve), which connects the master brake cylinder to the inlet of the return pump. A valve assembly (inlet and outlet valves) on the wheel or wheels is actuated to modulate the brake pressure at the slipping drive wheel in such as way as to reduce the drive slip.

In this known method and apparatus, the control valve (intake valve) is kept open, and therefore the pressure-generating means conveys pressure medium from the reservoir via the main brake cylinder during the entire drive slip control phase. If no brake pressure is built up or released at the brakes, the pressure medium flows back to the reservoir via a pressure-limiting valve bridging the switching valve. The noise thus produced is highly unsatisfactory.

Turning the pump on and off to reduce the noise level increases the wear on the pump.

U.S. Pat. No. 5,205,623 discloses a drive slip control system wherein, when at least one of the drive wheels experiences an elevated level of drive slip, the return pump is activated; the inlet and outlet valves at the wheel brakes, which are usually used to modulate the pressure, are opened; and the pressure is modulated by the appropriate opening and closing of the intake and switching valves. With the return pump running continuously, pressure is built up when the intake valve is opened and the switching valve is closed; and pressure is released when the intake valve is closed and the switching valve is opened. A wheel-specific modulation of the pressure level cannot be achieved in this known design unless the brake circuit is divided into appropriate subcircuits.

SUMMARY OF THE INVENTION

The object of the invention is to reduce the amount of noise produced and to decrease the load on the pressure-generating means while the drive slip control function is being carried out.

The method according to the invention improves the effectiveness with which drive slip can be controlled. It is especially advantageous that the amount of noise which is produced is decreased at the same time that the load on the pump is reduced.

The reduction in the noise level is attributable to the following factors: the abrupt opening and closing of the pressure-limiting valve at the switching valve is eliminated; the pressure-generating means continues to run throughout the entire control cycle, which has the effect of eliminating cavitation effects; and the pump operates with only a small degree of backpressure.

Another advantage is obtained from the fact that the operation of the pressure-limiting valve can be reduced to its safety function. There is no longer any need for this valve to meet expensive low-noise requirements.

The out-gassing of the brake fluid which occurs as a result of the sudden pressure drop after the fluid passes through the pressure-limiting valve is avoided.

Another advantage is that the lower backpressure and thus the decrease in the amount of power consumed decrease the load on the return pump.

Another advantage is that the delivery behavior of the pump at low temperatures is improved by the elimination of the out-gassing of the brake fluid and by the continuous operation of the pump during the automatic slip control cycle.

Another advantage is that the pressure medium continues to be conveyed around a circuit during the periods between pressure modulations (the periods during which the pressure is not being raised or lowered at any of the wheels). The medium is thus kept warm and has low viscosity. When the outside temperatures are low, it can thus be conveyed more quickly to all areas, which has the effect of improving the performance of the pump.

In addition, the measures according to the invention make it possible to modulate the pressure level independently at each wheel, so that the automatic control behavior is satisfactory even when the two drive wheels are encountering different degrees of friction ($\mu$-split driving surfaces).

By opening the outlet valve when the pressure is being decreased, furthermore, the brake pressure is released satisfactorily even at relatively low pressure levels.

According to the method of the invention, the intake valve remains open throughout the entire automatic slip control cycle, in contrast to U.S. Pat. No. 5,205,623.

As a result, the electrically actuated ASV can also be replaced by a hydraulically actuated ASV.

Further advantages can be derived from the following description of exemplary embodiments and from the dependent claims.

DESCRIPTION OF EXEMPLARY EMBODIMENTS

Figure 1:
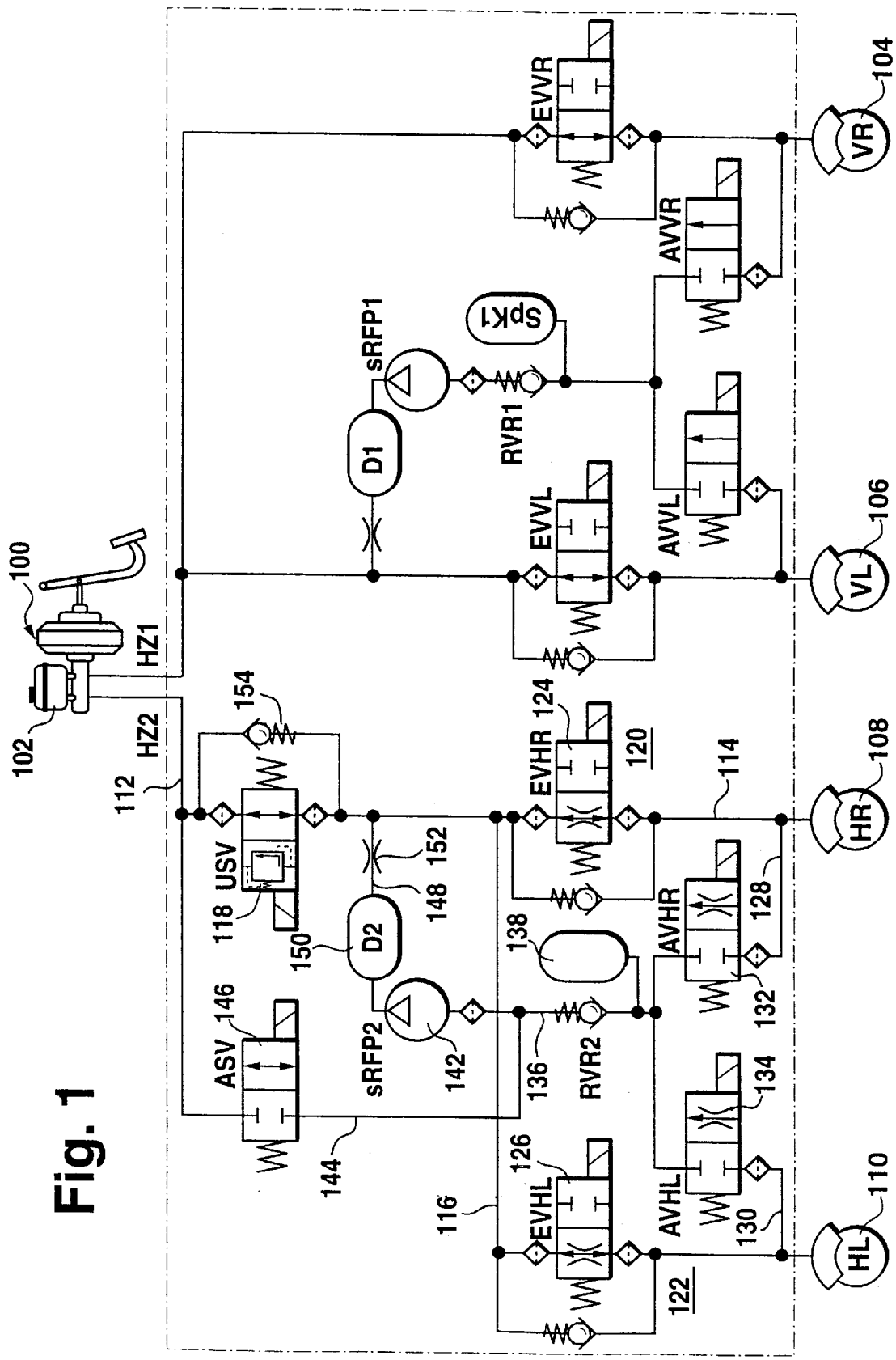
FIG. 1 shows an overall view of a brake system in a preferred exemplary embodiment.

Referring to FIG. 1, the brake system has a pedal-actuated, twin-circuit master brake cylinder 100 with a pressure medium reservoir 102. A first brake circuit (HZ1) is connected to wheel brakes 104, 106 of the nondriven wheels; in the exemplary embodiment shown here, these are the front wheels. The second brake circuit (HZ2) is connected to wheel brakes 108, 110 of the drive wheels. In the present case, these are the rear wheels of the vehicle. The second brake circuit has a brake line 112 leading from master brake cylinder 100; this line branches into two brake lines 114, 116 leading to wheel brakes 108, 110. A switching valve (USV) 118 with a spring-loaded open position and an electromagnetically switchable closed position is installed in brake line 112. On the wheel brake side, pressure control valve assemblies 120, 122 are assigned to wheel brakes 108, 110. Each valve assembly includes an inlet valve 124, 126 (EVHR, EVHL) with a spring-loaded open position and an electromagnetically switchable closed position; these inlet valves are installed in the corresponding brake lines 114, 116 and control the feed of pressure medium to wheel brakes 108, 110. Between the inlet valve and the wheel brake, a return line 128, 130 proceeds from the associated brake line. An outlet valve 132, 134 (AVHR, AVHL) is installed in each return line 128, 130. The outlet valves have spring-loaded closed positions and electromagnetically switchable open positions. Return lines 128, 130 join to form a common return line 136, to which a storage chamber 138 is connected. In the line between the storage chamber and the return pump (RFP) 142, a spring-loaded non-return valve RVR prevents negative pressure from developing in the wheel brake cylinders when an outlet valve 132, 134 is open. In addition, the brake circuit also has a high-pressure-generating pump 142, which is driven by an electric drive motor. An intake line 144 connects the self-priming pump (sRFP) to brake line 112, namely, to a point located between master brake cylinder 100 and switching valve 118. In intake line 144, there is an intake control valve (ASV) 146 with a spring-loaded closed position and an electromagnetically switchable open position. Return line 136 is connected to intake line 144. On the output side, pump 142 is connected by a delivery line 148 to brake line 112 at a point between switching valve 118 and pressure control valve assemblies 120, 122. A damping chamber 150 and a throttle 152 are installed in delivery line 148. In addition, a pressure-limiting valve 154 is provided, which bridges switching valve 118; when a certain response pressure is exceeded while switching valve 118 is closed, the pressure-limiting valve opens brake line 112 to lines 114, 116.

The first brake circuit HZ1 is designed in a corresponding manner; in the illustration according to FIG. 1, it controls the brakes of the nondriven wheels and thus does not have the components (ASV, USV) required for automatic slip control. In the case of all-wheel drive vehicles or in conjunction with a dynamic driving control system, the first brake circuit will be designed like the second circuit.

The method according to the invention can be applied not only to the division of the brake circuits shown here but also to any other division of the brake circuits (e.g., when the left front and right rear wheels are combined or when the right front and left rear wheels are combined into a single brake circuit).

The electrically controlled elements of the brake system are driven by an electronic control unit not shown in FIG. 1. This unit has drive lines, which connect it to the controllable valves and to the pump or pumps. Lines which proceed from measuring devices for detecting the at least the velocities of the vehicle wheels are connected as input lines to the electronic control unit.

The electronic control unit comprises at least a microcomputer, which determines the drive slip of the driven wheels in a manner known in itself from the wheel velocity signals being sent to it. In the preferred exemplary embodiment, this is done, for example, by comparison of the wheel velocity of one driven wheel with the mean value of the wheel velocities of the nondriven wheels. When a predefined slip threshold is exceeded, the microcomputer generates drive signals for the pump and the valves to build up or reduce the pressure and thus to modulate the brake pressure in the wheel brake or brakes of the wheels which are spinning so as to reduce the drive slip. The way in which the microcomputer works to accomplish this drive slip control process is explained on the basis of the flow charts of FIGS. 2 and 3 and on the basis of the timing diagrams of FIG. 4.

In addition to the application to the brake system like that illustrated in FIG. 1, the method according to the invention can also be applied advantageously to any brake system in which at least one pressure-generating means is provided to generate pressure, in which at least one control valve (e.g., USV) is provided to control the connection between the wheel brakes and the reservoirs, and in which a valve assembly (e.g., EV, AV) is assigned to each wheel brake to control the buildup and release of pressure independently for each wheel.

The essential point is that, in the ASR control mode, the pressure in the wheel brake cylinder is regulated automatically as needed by way of the inlet valve, the outlet valve, or the switching valve USV. The pump is running during the entire ASR control time. During pressure release phases, the switching valve and, if needed, the outlet valve also, are switched to their open positions. As a result, in the case of a vehicle in which the wheel brakes of one axle belong to the same brake circuit, the inlet valves can be used during the ASR operation to adjust the drive wheels to different brake pressures.

At the beginning of the ASR control cycle, when one or more drive wheels are spinning, pump sRFP is turned on (the intake valve, if present, is opened if necessary). The pressure in the wheel in question is regulated automatically by way of switching valve USV. When USV is in the closed position, the pressure builds up in the corresponding wheel brake cylinder as a result of the medium being delivered by the pump. When the wheel slip initiating the pressure buildup falls below a defined limit value, USV is switched to the open position to release the pressure. The brake fluid then flows back out of the wheel brake cylinder and through the inlet valve 124, 126, the associated nonreturn valve, and the USV. Once the pressure in the wheel brake cylinder has been reduced to the point that the slipping of the wheel has returned to or falls below a defined range, USV 118 is switched back to its closed position, and the pressure starts to build up again.

If the goal is to arrive at very low wheel brake cylinder pressures, the pressure-release phase can be supported by the additional actuation of the outlet valve.

Particular attention must be given to the automatic control process when the drive wheels have different coefficients of friction ($\mu$-split driving surfaces). In this case, the inlet valve of the assigned wheel brake cylinder in which there is no pressure or in which only a slightly lower pressure than in the other wheel brake cylinder is being built up, is switched to the closed position. If the pressure levels to be reached in the two drive wheels are different from each other, the lower pressure level is adjusted by the inlet and outlet valves, the higher pressure level by the switching valve.

Figure 2:
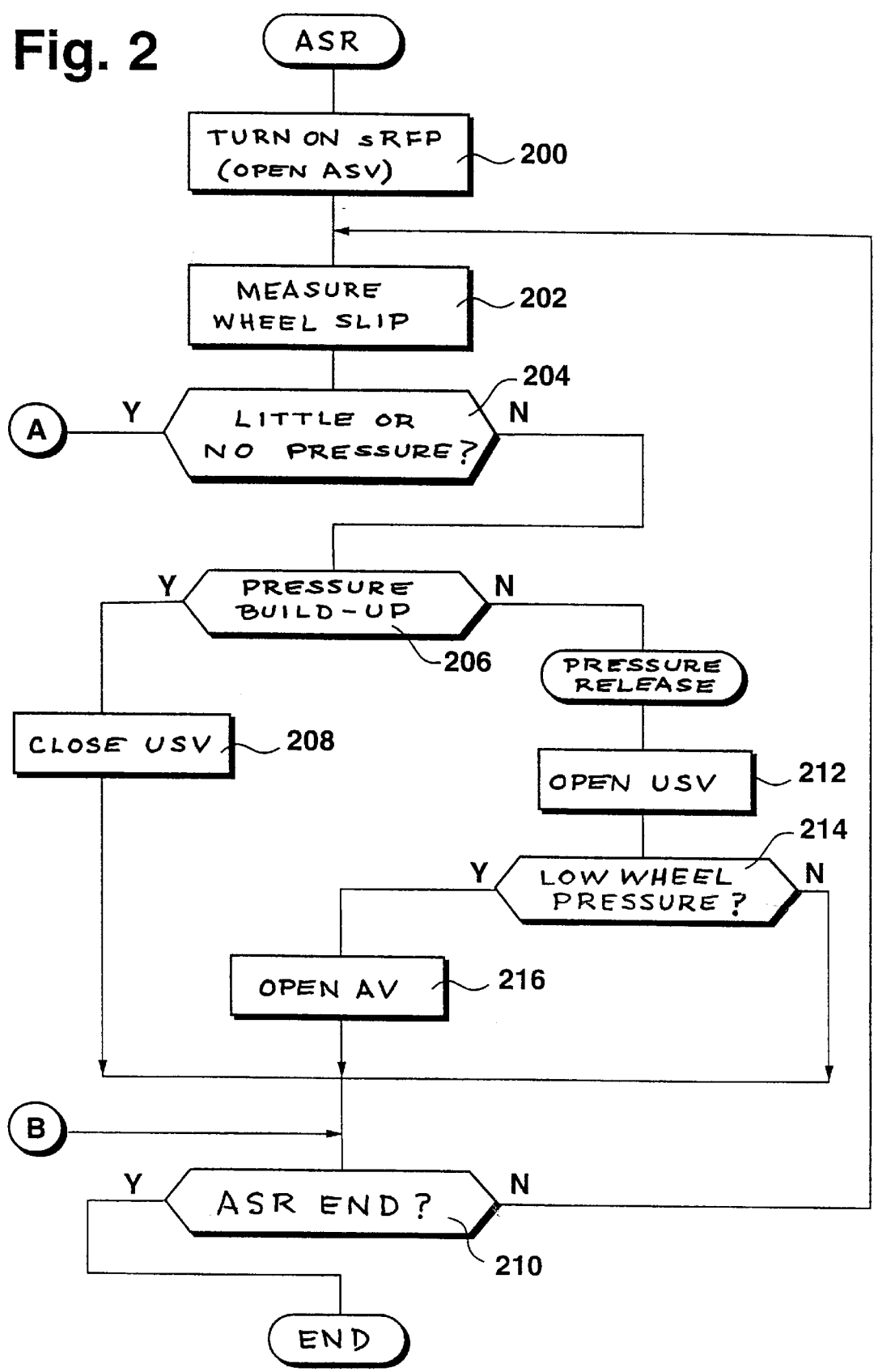
FIGS. 2 and 3 show a flow chart in two parts, depicting the method of the invention.
Figure 3:
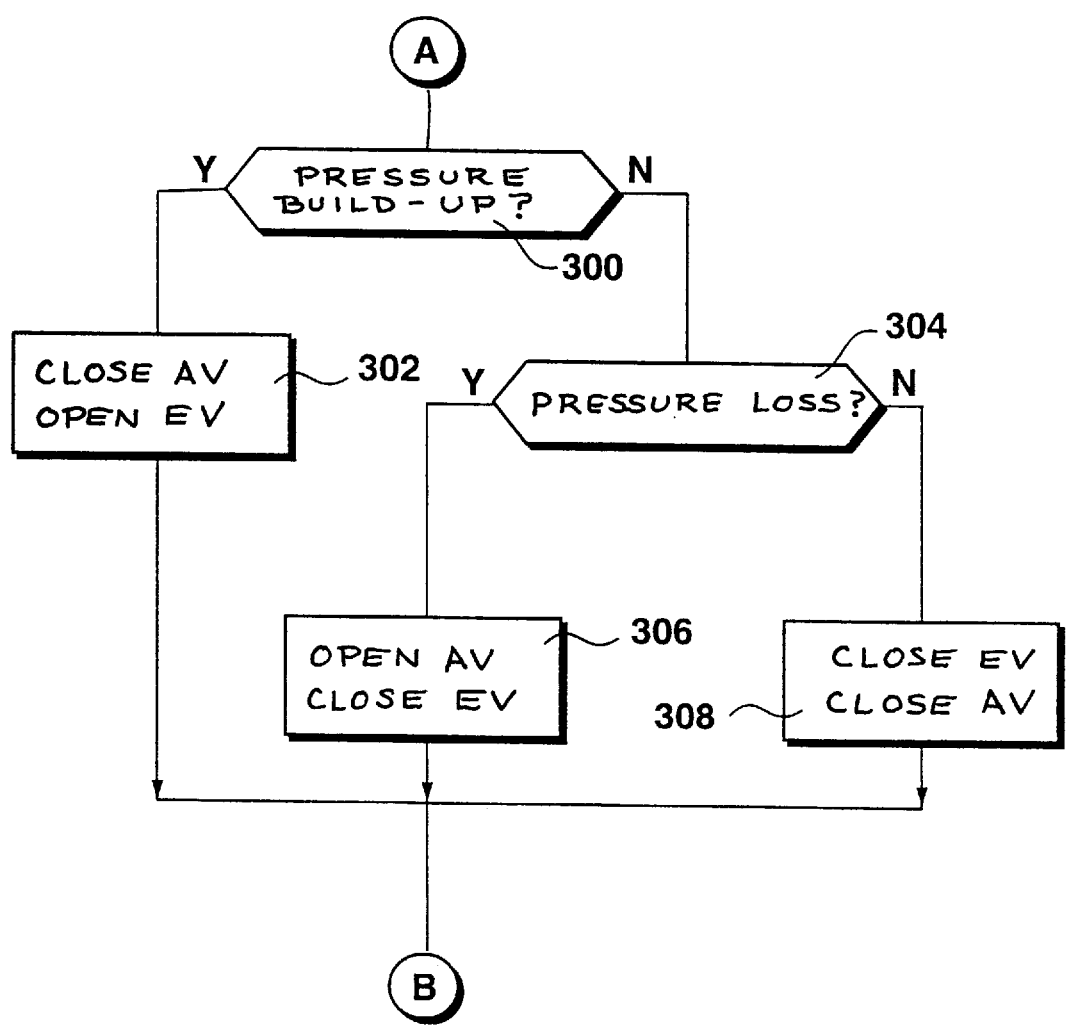
Figure 4A:
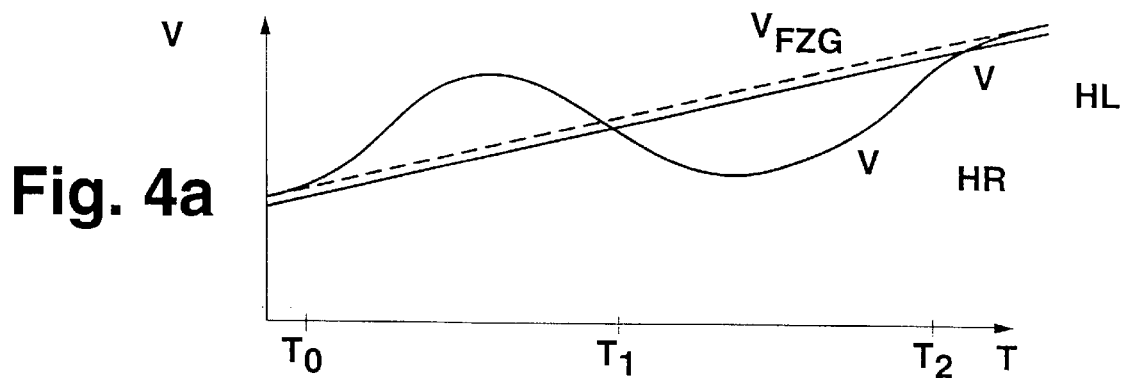
FIG. 4, finally, shows time diagrams of the relevant variables, which are used to describe the way in which the drive slip control system works.
Figure 4B:
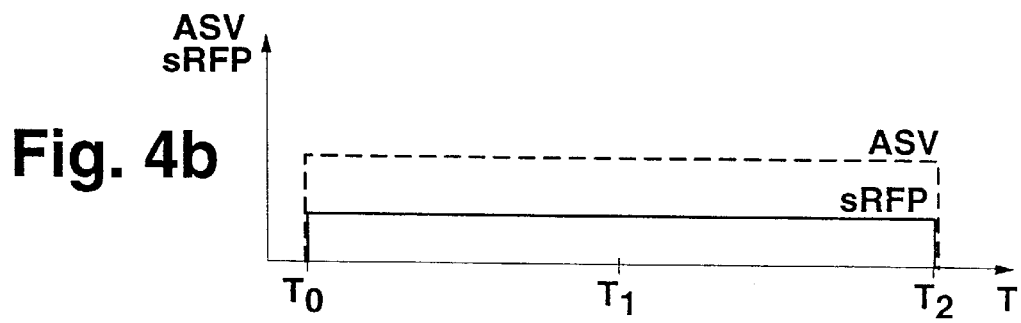
Figure 4C:
Figure 4D:
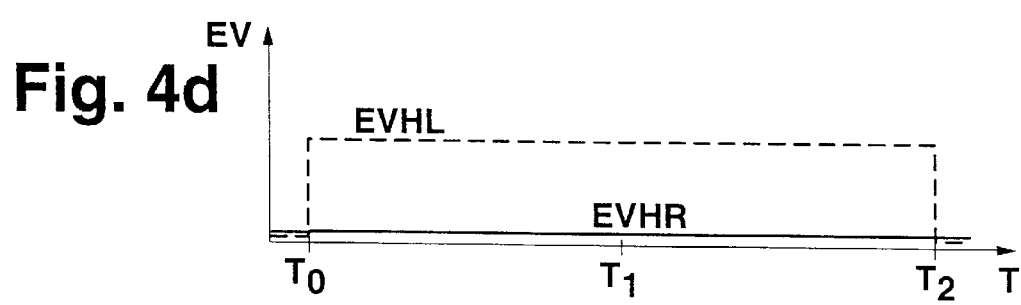
Figure 4E:
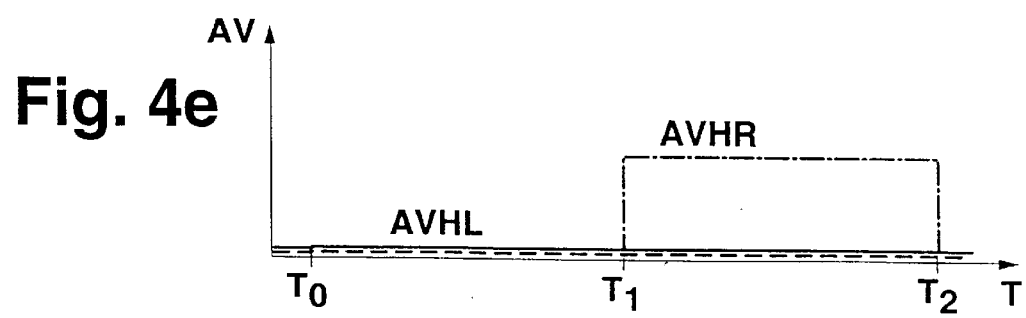

The flow charts of FIGS. 2 and 3 represent a preferred exemplary embodiment of the method according to the invention in the form of a computer program. The section of the program shown in FIGS. 2 and 3 is initiated by the start of a drive slip control cycle. This is usually the case when one of the wheels starts to slip, as determined from the various wheel velocities, and the extent of this slippage exceeds a defined limit value for the first time. In the preferred exemplary embodiment, the return pump sRFP is turned on and the intake control valve 146 is opened in step 200, the first step of the program. The Inlet valves 124, 126 and outlet valves 132, 134 are not driven; that is, the inlet valves remain open, and the outlet valves remain closed. Then, in step 202, on the basis of the wheel velocity signals being received, the slip of the wheel is detected. The pressure level in the wheel brake cylinder is estimated in step 202 from the pressure buildup and release times in accordance with the curves of the pressure buildup and release versus time. Then, in step 204, the program checks to see whether no pressure at all or only a lower pressure level is to be maintained in the wheel to which the program is being applied. Either the estimated brake pressures, the slip values, or the determined adhesion coefficients are compared with each other. No pressure or only a low pressure level is to be maintained at the assigned wheel (reduced wheel slip, lower pressure, or higher adhesion coefficient), then the approach illustrated in FIG. 3 is taken. If, according to step 204, the wheel in question is the wheel with the higher drive slip, then the program checks in step 206 to see whether the pressure should be built up or not. This will be the case when the detected wheel slip exceeds a defined limit value. In this case, the switching valve is switched to its closed position in step 208 (the outlet valve is closed if necessary). This leads a situation in which the return pump 142 conveys pressure medium from the reservoir 102 through the opened intake valve 146, into the brake line 114, 116, and through the corresponding inlet valve 124, 126 to the associated wheel brake. After step 208, the program checks in the following step 210 to see whether the drive slip control process is over. This will be the case when, for example, the brake pedal has been actuated or when neither wheel shows excessive slip after both brakes have been released. If this is the case, this section of the program ends. Otherwise, step 202 is repeated at fixed intervals. If the program has found in step 206 that there is no longer any need to increase the pressure, because the wheel slip does not exceed the predetermined limit value, pressure is released from the wheel brakes. This is accomplished in accordance with step 212 by the opening of the switching valve. As a result, pressure medium can flow out from the wheel brakes via the inlet valves 124, 126 and the switching valve 118 and return to the reservoir 102. If it is found in the following step 214 that the pressure level in the wheel brake has fallen below a defined limit value, then, to support the release of the pressure, the corresponding outlet valve 132, 134 is opened in step 216. As a result, the pump actively conveys pressure medium out of the wheel brakes, so that the pressure release, especially in cases of low wheel pressure levels, proceeds more quickly. At a high wheel pressure, this measure is unnecessary, which means that there is no need to open the outlet valve. In some embodiments, the outlet valve is also opened at high pressure. Step 210 is executed again after step 216 or step 214.

If the program has found in step 204 that no pressure at all or only a lower pressure level than that in the other wheel brakes is required in the wheel brake assigned to the section of the program shown in FIGS. 2 and 3, then the program branches to the section shown in FIG. 3. Here, in the first step 300, the program examines the wheel slip value to determine whether it is necessary to build up the pressure. If this is the case, in step 302 the outlet valve 132, 134 is closed; the inlet valve 124, 126 is opened; and the program continues with step 210. If no pressure buildup is desired, the program checks in step 304 to see whether the pressure should be released. If this is the case, in step 306 the outlet valve is opened; the inlet valve is closed; and the program continues with step 210. If there no need to decrease the pressure either, that is, if the slip of the wheel in question is within an acceptable range, then in step 308 the inlet and the outlet valves are both closed. Then the program continues with step 210.

The embodiment illustrated in FIGS. 2 and 3 makes it possible for the pressure level to be modulated individually at each wheel brake on so-called $\mu$-split driving surfaces. If no pressure is built up, the inlet valve is closed, so that the pressure level in the other wheel brake can be controlled by way of the switching valve. If different pressure levels are to be produced, the pressure is modulated by way of the inlet and outlet valves in the wheel with the lower pressure level, whereas the pressure is adjusted by way of the switching valve according to FIG. 2 in the wheel with the higher pressure level.

The way in which the drive slip control process illustrated in FIGS. 2 and 3 works is illustrated in additional detail by the time diagrams of FIG. 4. FIG. 4a shows the course of the wheel driven velocities $V_{HR}$ and $V_{HL}$ over time. FIG. 4b shows the activity of the return pump SRFP and the position of the intake control valve ASV. FIG. 4c shows the position of the switching valve USV as a function of time. FIG. 4d shows the position of the inlet valves EV as a function of time. And FIG. 4e shows the position of the outlet valves AV as a function of time. A situation is represented in which the right rear wheel HR shows elevated slip, whereas the left rear wheel HL does not show an elevated level of slip. At time $T_0$ (FIG. 4a), elevated slip is recognized by comparison of the wheel velocity $V_{HR}$ with the measured or estimated vehicle velocity $V_{FZG}$. This slip increases initially and then decreases as a result of the action of the brake. At time $T_1$, the wheel velocity $V_{HR}$ falls below the vehicle velocity. By releasing the brake in an appropriate manner, the wheel velocity according to this example approaches the vehicle velocity again at time $T_2$, so that the drive slip control cycle can be terminated. In a corresponding manner, upon the occurrence of wheel slip, the return pump is activated and the intake control valve ASV is opened at time $T_0$, they are kept in that status until time $T_2$. The switching valve USV is driven, that is, kept closed (pressure buildup phase), from time $T_0$ to time $T_1$. So that the pressure can be released between times $T_1$ and $T_2$, the switching valve is then opened again; that is, its drive signal is turned off. According to the preferred exemplary embodiment, the inlet valve EVHL of the nonslipping wheel is driven from time $T_0$ to time $T_2$ and thus kept closed, because there is no need to increase the pressure there (see FIG. 4d, dotted line). In accordance with FIG. 2, the inlet valve EVHR of the slipping drive wheel is not driven at any time during the control cycle; that is, it is kept open (see FIG. 4e, solid line). The outlet valve control is shown in FIG. 4d. The outlet valve AVHL of the nonslipping drive wheel is not driven at all during the entire time; that is, it is kept closed (broken line); whereas, at a low pressure level, during the pressure-release phase between time $T_1$ and time $T_2$, the outlet valve AVHR of the slipping wheel is driven, that is, opened (dash-dot line), at the time the pressure level falls below a defined limit value. At high pressure levels, the outlet valve AVHR of the slipping wheel is not driven (solid line).

If more than two wheel brakes are connected to one brake circuit, the pressure at the wheel brake or brakes with the higher pressure level is driven by the switching valve, while the pressure at the brake or brakes with the lower pressure level is driven by way of the inlet and outlet valves.

We claim:

1. Method for controlling brakes at the driven wheels of a vehicle, said method comprising providing a reservoir containing a pressure medium, pressure generating means for transmitting pressure from the reservoir to the brakes of the driven wheels via said medium, said pressure generating means having an inlet, a master cylinder connected with a first line communicating with the wheel brakes and a second line communicating with the inlet of said pressure generating means, first control valve means in said first line between the master cylinder and the wheel brakes, second control valve means in said second line between the master cylinder and the intake side of the pressure generating means, and brake valve means assigned to each driven wheel, determining when drive slip occurs at at least one of the driven wheels, initiating a slip control cycle responsive to a determination of drive slip being present, actuating the pressure generating means and opening the second control valve means in the second line between the master cylinder and the intake side of the pressure generating means during said slip control cycle so that the second control valve means is kept open during the entire slip control cycle, controlling the pressure at the brake of one driven wheel by actuating said first control valve means in said first line between the master cylinder and the wheel brakes in order to reduce the drive slip at said wheel, and controlling the pressure at the brakes of another driven wheel by additionally actuating said brake valve means when the pressure at said other wheel is to be different from the pressure applied at said one wheel.

2. Method according to claim 1, wherein the first control valve means is a valve which selectively closes the connection between the reservoir and the wheel brakes to build up the pressure and opens the connection to decrease the pressure.

3. Method according to claim 1, wherein said brake valve means includes a respective valve assembly associated with each driven wheel, which builds up, releases, or maintains the pressure in the associated wheel brake.

4. Method according to claim 1, wherein, in the wheel brakes where a lower pressure level is to be adjusted, the brake valve means provides the automatic pressure level control, and, in the wheel brake where the highest pressure level is to be adjusted, the first control valve means provides the adjustment.

5. Method according to claim 4, wherein during the adjustment of the lower wheel brake cylinder pressures in the course of the pressure-release phase, not only the first control valve means but also the brake valve means assigned to the wheel brake is operated so as to support the release of pressure.

6. Method according to claim 5, wherein the brake valve means comprises a respective outlet valve associated with each driven wheel, said outlet valve being adapted to be opened.

7. Method according to claim 1, wherein, when no pressure is to be built up in the assigned wheel brake, the brake valve means closes communication between the wheel brake and the first and second lines.

8. An apparatus for controlling brakes at driven wheels of a vehicle, said apparatus comprising:

a reservoir containing a pressure medium;

a master cylinder operatively associated with the pressure medium;

a pump having an inlet receiving said medium from the reservoir for transmitting said medium under pressure to the brakes of the driven wheels;

a first line communicating with the master cylinder and providing a connection between said master cylinder and the brakes of the driven wheels;

said first line having first control valve means between said master cylinder and the brakes of the driven wheels for selectively permitting and interrupting the connection therebetween;

a second line communicating with the master cylinder and providing a connection between said master cylinder and the inlet of said pump;

said second line having second control valve means between the master cylinder and the intake of the pump for selectively permitting and interrupting the connection therebetween;

the brake of each driven wheel being associated with a respective brake valve means for build-up, release, or maintaining of pressure at the associated brake, said brake valve means being a valve assembly including an inlet valve receiving medium from said pump and said first line and selectively transmitting the medium to the associated brake and an outlet valve selectively permitting flow of the medium away from the associated brake;

electronic control means for determining when drive slip occurs in at least one of the driven wheels, said electronic control means controlling said pump, said first and second control valve means, and said brake valve means in a slip control cycle responsive to a detection of drive slip in one of said driven wheels so as to reduce said drive slip;

in said slip control cycle, said electronic control means starting the pump and opening the second control valve means in the second line between the master cylinder and the intake side of the pump during said slip control cycle so that the second control valve means is kept open during the entire slip control cycle to provide the medium under pressure to the brakes, controlling the pressure at the brake at the driven wheel experiencing drive slip by actuating said first control valve means in said first line between the master cylinder and the wheel brake so as to reduce the drive slip at said wheel, and controlling the pressure at another of said driven wheels by actuating the inlet or outlet valve of the brake valve means associated with the brake of said other wheel when it is determined that the brake at said other wheel should receive a pressure different from the pressure applied to said driven wheel experiencing drive slip.

9. Apparatus for controlling brakes at driven wheels of a vehicle, said apparatus comprising a reservoir containing a pressure medium, pressure generating means for transmitting pressure from the reservoir to the brakes of the driven wheels via said medium, said pressure generating means having an inlet, a master cylinder connected with a first line communicating with the wheel brakes and a second line communicating with the inlet of said pressure generating means, first control valve means in said first line between the master cylinder and the wheel brakes, second control valve means in said second line between the master cylinder and the intake of the pressure generating means, brake valve means assigned to each driven wheel to build-up, release, or maintain pressure at each driven wheel, and electronic control means for determining when drive slip occurs in at least one of the driven wheels, and for controlling said pressure generating means, said first and second control valve means, and said brake valve means in a slip control cycle responsive to a detection of drive slip in one of said driven wheels so as to reduce mid drive slip, said electronic control means actuating the pressure generating means and opening the second control valve means in the second line between the master cylinder and the intake side of the pressure generating means during said slip control cycle so that the second control valve means is kept open during the entire slip control cycle, said electronic control means controlling the pressure at the brake at said one of said driven wheels by actuating said first control valve means in said first line between the master cylinder and the wheel brake so as to reduce the drive slip at said wheel, said electronic control means controlling the pressure at another of said driven wheels by additionally actuating said brake valve means when the pressure at said other wheel is to be different from the pressure applied to said one wheel.

10. Apparatus according to claim 9, wherein that the first control valve means is a valve which selectively closes the connection between the reservoir and the wheel brakes to build up the pressure and opens the connection to decrease the pressure.

11. Apparatus according to claim 9, wherein said brake valve means includes a respective valve assembly associated with each driven wheel, which builds up, releases, or maintains the pressure in the associated wheel brake.

12. Apparatus according to claim 9, wherein, in the wheel brakes where a lower pressure level is to be adjusted, the brake valve means provides the automatic pressure level control, and, in the wheel brake where the highest pressure level is to be adjusted, the first control valve means provides the adjustment.

13. Apparatus according to claim 9, wherein during the adjustment of the lower wheel brake cylinder pressures in the course of the pressure-release phase, the electronic control means operates the first control valve means and the brake valve means assigned to the wheel brake so as to support the release of pressure.

14. Apparatus according to claim 13, wherein the brake valve means comprises a respective outlet valve associated with each driven wheel, said outlet valve being adapted to be opened.

15. Apparatus according to claim 9, wherein, when no pressure is to be built up in the assigned wheel brake, the brake valve means closes communication of the medium between the wheel brake and the first and second lines.

* * * * *

UNITED STATES PATENT AND TRADEMARK OFFICE
CERTIFICATE OF CORRECTION

PATENT NO.    :    5,826,950

DATED         :    Oct. 27, 1998

INVENTOR(S)   :    Jonner, et al.

It is certified that error appears in the above-identified patent and that said Letters Patent are hereby corrected as shown below:

In column 3, line 48, change "detecting the at" to -- detecting at --.
In column 9, line 5, change "mid" to -- said --.

Signed and Sealed this

Twenty-seventh Day of June, 2000

*Attest:*

Q. TODD DICKINSON

*Attesting Officer*          *Director of Patents and Trademarks*